United States Patent
Li et al.

(10) Patent No.: US 10,913,657 B2
(45) Date of Patent: Feb. 9, 2021

(54) METHOD FOR PREPARING FUNCTIONALIZED CARBON MATERIALS

(71) Applicant: Shanghai Jiaotong University, Shanghai (CN)

(72) Inventors: Tao Li, Shanghai (CN); Zhaoyang Zhang, Shanghai (CN); Ying Zhou, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 71 days.

(21) Appl. No.: 16/246,120

(22) Filed: Jan. 11, 2019

(65) Prior Publication Data

US 2019/0144282 A1 May 16, 2019

Related U.S. Application Data

(63) Continuation of application No. PCT/CN2016/107627, filed on Nov. 29, 2016.

(30) Foreign Application Priority Data

Aug. 12, 2016 (CN) .......................... 2016 1 0659324

(51) Int. Cl.
| | |
|---|---|
| *C01B 32/174* | (2017.01) |
| *C01B 32/00* | (2017.01) |
| *C01B 32/156* | (2017.01) |
| *C01B 32/194* | (2017.01) |
| *C01B 32/176* | (2017.01) |
| *C01B 32/23* | (2017.01) |

(52) U.S. Cl.
CPC ............ *C01B 32/174* (2017.08); *C01B 32/00* (2017.08); *C01B 32/156* (2017.08); *C01B 32/176* (2017.08); *C01B 32/194* (2017.08); *C01B 32/23* (2017.08); *C01B 2202/02* (2013.01); *C01B 2202/06* (2013.01); *C01B 2202/34* (2013.01); *C01B 2202/36* (2013.01); *C01B 2204/32* (2013.01); *C01P 2002/82* (2013.01); *C01P 2002/85* (2013.01); *C01P 2004/133* (2013.01); *C01P 2004/24* (2013.01); *C01P 2004/64* (2013.01); *C01P 2006/22* (2013.01)

(58) Field of Classification Search
CPC ..... C01B 32/174; C01B 32/23; C01B 32/176; C01B 2202/36; C01B 2202/34; C01B 2202/02; C01B 2202/06; C01B 2204/32; C01P 2004/133; C01P 2002/82; C01P 2002/85; C01P 2004/64; C01P 2006/22; C01P 2004/24

See application file for complete search history.

(56) References Cited

FOREIGN PATENT DOCUMENTS

| | | |
|---|---|---|
| CN | 104386671 A | 3/2015 |
| CN | 105271202 A | 1/2016 |
| CN | 105776187 A | 7/2016 |
| CN | 105819438 A | 8/2016 |

OTHER PUBLICATIONS

English machine translation of CN105271202.*
Zhang, Zhao-yang, and Xue-cheng Xu. "Nondestructive covalent functionalization of carbon nanotubes by selective oxidation of the original defects with K2FeO4." Applied Surface Science 346 (2015): 520-527.*
Peng, Li, et al. "An iron-based green approach to 1-h production of single-layer graphene oxide." Nature communications 6.1 (2015) : 1-9.*
Posudievsky, Oleg Yu, et al. "Preparation of graphene oxide by solvent-free mechanochemical oxidation of graphite." Journal of Materials Chemistry 22.25 (2012): 12465-12467.*
International Search Report (English and Chinese) and Written Opinion issued in PCT/CN2016/107627, dated May 17, 2017; 9 pages.

* cited by examiner

*Primary Examiner* — Richard M Rump
(74) *Attorney, Agent, or Firm* — Hamre, Schumann, Mueller & Larson, P.C.

(57) ABSTRACT

The present invention belongs to the field of new materials technology and discloses a green method for preparing functionalized carbon materials. The present invention can use potassium ferrate(VI) as an oxidant and mechanical milling as a reaction technique for oxidizing carbon materials in a preparation of functionalized carbon materials having oxygen-containing functional groups. Compared with the prior art, the present invention provides a method that combines an environmentally friendly oxidant with an environmentally friendly reaction process. The oxidant potassium ferrate(VI) is a green oxidant without producing any toxic byproducts. The reaction process is solvent-free, facilitated by milling the solid mixture of carbon materials and the oxidant. Thus, the present invention provides an environmentally friendly method for preparing oxidatively functionalized carbon materials, which is of promotion value.

4 Claims, No Drawings

METHOD FOR PREPARING FUNCTIONALIZED CARBON MATERIALS

FIELD

The present invention belongs to the field of new materials technology and relates to a method for preparing functionalized carbon materials.

BACKGROUND

Carbon materials family consists of a broad class of materials including the traditionally known graphite, diamond, carbon black, glassy carbon, activated carbon, carbon fiber, and newly developed nanocarbons, such as fullerene, carbon onion, carbon nanotubes, graphene, graphdiyne, as well as other materials composed primarily of elemental carbon. Because of their abundant structures and unique properties, carbon materials have attracted great attentions in fundamental research and technological applications. For many applications, the structures and properties of carbon materials have to be chemically modified. As such, chemical functionalization has become an important scientific and technical issue.

Chemical oxidation is the most widely used functionalization method, which plays an important role in the science and applications of carbon materials. Chemical oxidation introduces oxygenated groups on their surface, which increases their dispersibility in solvents and provides initial active sites for further attachment of specific functional moieties. Currently, oxidatively functionalized carbon materials and their derived products have been commercialized and are used for producing high-performance composites.

To produce oxidized carbon materials, wet oxidation is widely used, in which $KMnO_4$ and $HNO_3$ are generally used as oxidants and concentrated $H_2SO_4$ is chosen as a reaction medium. Taken carbon nanotubes as an example, such kinds of oxidation treatments have been widely adopted for not only laboratory research but also industrial production, by manufactures like Timesnano ($KMnO_4/H_2SO_4$), US Research Nanomaterials ($KMnO_4/H_2SO_4$), Nanolab ($HNO_3/H_2SO_4$) and Carbon Solutions ($HNO_3$). However, these oxidation methods employ environmentally hazardous oxidizers and solvents, which is against the principles of green chemistry and clean manufacturing. On the one hand, $KMnO_4$ and $HNO_3$ as the oxidizers are converted to toxic heavy metal ions ($Mn^{2+}$) and pollutant gas ($N_xO_y$), respectively. On the other hand, the use of concentrated sulfuric acid as the reaction medium brings a large amount of acidic waste liquid.

A large number of laboratories around the world are now working on carbon materials and there is an increasing industrial production of oxidatively functionalized carbon materials and their derived products. Therefore, the environmental problems caused by those oxidation treatments have raised great concerns. An environmentally friendly oxidation method is needed.

BRIEF SUMMARY OF THE INVENTION

In order to solve the problems mentioned above, the present invention provides an oxidation method combining a green oxidant with a green oxidation process. That is, use of potassium ferrate(VI) as an oxidant and a solvent-free mechanochemical way to achieve a green oxidation in a production of functionalized carbon materials.

The object of the present invention can be achieved by the following technical solutions:

a method of preparing functionalized carbon materials by oxidizing carbon materials with potassium ferrate(VI) under grinding or milling, includes steps of:

(1) reacting potassium ferrate(VI) with a carbon material by grinding or milling the potassium ferrate(VI) and the carbon material;

(2) conducting a post-treatment including washing the reaction mixture to remove impurities including iron salt and obtain an oxidized carbon material.

The functionalized carbon material contains oxygen-containing functional groups.

The mentioned carbon material includes carbon nanotubes, fullerene, graphite, graphene, diamond, carbon black, glassy carbon, activated carbon, carbon fiber, carbon onion and other materials composed primarily of elemental carbon. Carbon nanotubes are preferred.

The mentioned functionalized carbon materials contain carbon materials with surface oxygen-containing groups.

The mentioned carbon nanotubes include multiwalled carbon nanotubes, double-walled carbon nanotubes and single-walled carbon nanotubes.

The reaction process in which the carbon material is oxidized by potassium ferrate(VI) under milling does not involve any solvent.

The mentioned milling reaction can be performed by manual milling or machine milling. The manual milling can be performed with a manual milling or grinding or dispersing device. In an example, the manual milling or grinding or dispersing device can include a mortar and a pestle. The machine milling can be performed with a machine milling or grinding or dispersing device. The machine milling or grinding or dispersing device can include planetary ball mill machine, vibration ball mill machine, stirring dispersing machine, grinder, or any other devices that can perform milling, grinding, or dispersing. Ball milling is preferred. The optimum milling strength is dependent on the structural characteristics of the specific carbon material.

The mass ratio of the carbon material to potassium ferrate(VI) for a reaction is 1:5-50.

The time of a milling reaction is 0.5-72 hours.

In the step of the post treatment, the washing can be conducted by filtration or centrifugation. The washing can be performed with an acid solution to remove iron salt and then further with a solvent such as water, ethanol, etc. to remove excessive acid. The post treatment can also include a drying process including ambient pressure drying, vacuum drying or freeze drying. The post treatment also can employ any other suitable method that can remove iron salt to obtain an oxidized carbon material.

During the milling, the carbon material and potassium ferrate(VI) are ground and mixed with each other under mechanical force. The carbon material and potassium ferrate (VI) are brought into intimate contact with each other, which enables the reaction. Due to the strong oxidizing power of potassium ferrate(VI) and the activating effect of mechanical force on chemical reactions, the carbon material can be gradually oxidized to generate oxygen-containing groups, such as carboxyl and hydroxyl groups, etc., on a surface thereof, resulting in a functionalized carbon material.

Under mild mechanical force, potassium ferrate(VI) can effectively oxidize defect site ($sp^3$-C) of the carbon material, without breaking the graphitized C=C structure. When increasing the time and intensity of the milling, the carbon material can gradually produce new surface defects, and is further oxidized by potassium ferrate. The milling intensity and duration can be determined in accordance with the degree of graphitization of the carbon material and the degree of oxidation required.

Compared with the prior art, the present invention has the following advantages and benefits:

1. The oxidant is potassium ferrate(VI) whose reduced product is non-toxic Fe(III), eliminating the harmful environment impact of toxic by-products from using the traditional oxidants, such as $KMnO_4$ and $HNO_3$.

2. The reaction is conducted in the absence of a solvent, which avoids producing a large amount of acidic waster due to use of concentrated sulfuric acid as a solvent. This also saves the cost of solvent and is environmentally safe.

3. Mechanical milling is a well-established technique in industry, which means that the method provided in this invention is practical in the large-scale production of oxidized carbon materials.

DETAILED DESCRIPTION OF THE INVENTION

Hereinafter, the present invention will be described in detail with reference to embodiments.

Embodiment 1

This embodiment provides an environmentally friendly mechanochemical method for functionalizing multiwalled carbon nanotubes by manual milling, including steps of:

First, 0.1 g of multiwalled carbon nanotubes (diameter 15-30 nm, length >10 μm) and 1 g of potassium ferrate(VI) were grinded together in an agate mortar for 30 minutes. Then the resulting mixture was slowly added into 50 ml of 2 M HCl and settled for 2 hours, followed by centrifugation at 3500 rpm for 3 min to obtain solids. The obtained solids were then dispersed in water under brief sonication, followed by filtration (0.22 μm PTFE membranes) and successive washing with 2 M HCl, water, and alcohol. The resultant product was dried at 60° C. in a vacuum oven to obtain the oxidized multiwalled carbon nanotubes.

Both the samples of the multiwalled carbon nanotubes and the oxidized multiwalled carbon nanotubes were analyzed by X-ray photoelectron spectroscopy (XPS). The results show that the multiwalled carbon nanotubes have an O/C (oxygen/carbon) ratio of 3.5%, and that the oxgened multiwalled carbon nanotubes have an O/C ration of 8.4%.

Embodiment 2

Embodiment 2 provides an environmentally friendly solvent-free mechanochemical method for oxidation of multiwalled carbon nanotubes using a ball mill. The method includes the following steps:

First, 0.2 g of multiwalled carbon nanotubes (diameter 15-30 nm, length >10 μm) and 4 g of potassium ferrate(VI) were briefly ground in an agate mortar to obtain a mixture. The mixture was then introduced into a 50 mL stainless milling jar together with 50 g of 5 mm-diameter stainless steel balls. Ball milling was performed at a rotational speed of 300 rpm for 2 hours. Then the resulting mixture was slowly added into 50 ml of 2 M HCl and settled for 2 hours, followed by centrifugation at 3500 rpm for 3 min to obtain solids. The obtained solids were then dispersed in water under brief sonication, followed by filtration (0.22 μm PTFE membranes) and successive washing with 2 M HCl, water, and alcohol. The resultant product was dried at 60° C. in a vacuum oven to obtain the oxidized multiwalled carbon nanotubes.

Samples of the multiwalled carbon nanotubes and the oxidized multiwalled carbon nanotubes were analyzed by XPS, showing the O/C ratio increased from 3.5% to 11.3%. The obtained product has excellent dispersibility in a variety of solvents, and solubility in water of 4.8 mg/mL.

Embodiment 3

Embodiment 3 provides a solvent-free mechanochemical method for green oxidation of single-walled carbon nanotubes using a ball mill. The method includes the following steps:

First, 0.4 g of single-walled carbon nanotubes (diameter 1-2 nm, length 5-30 μm) and 8 g of potassium ferrate(VI) were briefly grinded in an agate mortar to mix them together. The mixture was then introduced into a 100 mL stainless milling jar together with 100 g of 5 mm-diameter stainless steel balls. Ball milling was performed at a rotational speed of 300 rpm for 24 hours. Then the resulting mixture was slowly added into 100 ml of 2 M HCl and settled for 2 hours, followed by centrifugation at 3500 rpm for 3 min to obtain solids. The obtained solids were then dispersed in water under brief sonication, followed by filtration (0.22 μm PTFE membranes) and successive washing with 2 M HCl, water, and alcohol. The resultant product was dried at 60° C. in a vacuum oven to obtain the oxidized single-walled carbon nanotubes.

Samples of the single-walled nanotubes and the oxidized single-walled carbon nanotubes were analyzed by XPS, showing the O/C ratio increased from 0.5% to 18.4%. Raman spectra of the samples showed that the D/G intensity ratio increased from 0.03 to 0.35.

Embodiment 4

Embodiment 4 provides a solvent-free mechanochemical method for green oxidation of graphite using a ball mill. The method includes the following steps:

0.5 g of graphite (325 mesh) and 3 g of potassium ferrate(VI) were added into a 100 mL stainless milling jar together with 50 g of 5 mm-diameter stainless steel balls. Ball milling was performed at a rotational speed of 500 rpm for 48 hours. Then the resulting mixture was slowly added into 100 ml of 2 M HCl and settled for 2 hours, followed by centrifugation at 3500 rpm for 3 min to obtain solids. The obtained solids were then dispersed in water under brief sonication, followed by filtration (0.22 μm PTFE membranes) and successive washing with 2 M HCl and water. The resultant product was then sonicated in water to obtain a stable colloidal dispersion of oxidized graphitic nanoplatelets.

The above description of embodiments are only for easy understanding and using of the present invention by one of ordinary skills in this art. Those skilled in this art can easily make various changes to these embodiments and apply the general principle described here to other embodiments without creative work. Therefore, the present invention is not limited to the above-described embodiments, and modifications and changes made without departing from the scope of the present invention by those skilled in this art according to the disclosure of the present invention would fall within the scope of the present invention.

What is claimed is:

1. A method for preparing a functionalized carbon material, comprising milling a carbon material and potassium ferrate(VI) to oxidize the carbon material to produce an oxidized carbon material,
wherein the carbon material includes carbon nanotubes,
the carbon nanotubes include one or more selected from the group consisting of multiwalled carbon nanotubes, double-walled carbon nanotubes, and single-walled carbon nanotubes,
the functionalized carbon material has oxygen-containing groups on a surface thereof,
oxidation between the carbon material and potassium ferrate(VI) does not need any solvent, and
the mass ratio of the carbon material to potassium ferrate(VI) is 1:5-50.

2. The method according to claim 1, wherein the method further includes performing a post treatment of the oxidized carbon material.

3. The method according to claim 1, wherein the milling is a manual milling or a machine milling, the manual milling is performed with a manual milling or grinding or dispersing device, and the machine milling is performed with a machine milling or grinding or dispersing device.

4. The method according to claim 3, wherein the manual milling or grinding or dispersing device includes at least one selected from the group consisting of a mortar and a pestle, and the machine milling or grinding or dispersing device includes planetary ball mill machine, vibration ball mill machine, stirring dispersing machine, or grinder.

* * * * *